United States Patent [19]

Clark

[11] 3,985,487
[45] Oct. 12, 1976

[54] APPARATUS FOR MAKING POLYTETRAFLUOROETHYLENE SEALING ELEMENTS WITH HYDRODYNAMIC ACTION

[75] Inventor: William E. Clark, Chelsea, Mich.

[73] Assignee: Federal-Mogul Corporation, Southfield, Mich.

[22] Filed: Sept. 18, 1975

[21] Appl. No.: 614,680

Related U.S. Application Data

[60] Division of Ser. No. 523,451, Nov. 13, 1974, Pat. No. 3,929,341, Continuation-in-part of Ser. No. 426,365, Dec. 19, 1973, abandoned.

[52] U.S. Cl. .......................... 425/304; 425/DIG. 47; 425/385; 425/394
[51] Int. Cl.² ........................................ B29C 17/00
[58] Field of Search ............ 425/304, DIG. 47, 385, 425/394

[56] References Cited
UNITED STATES PATENTS

| | | | |
|---|---|---|---|
| 2,950,506 | 8/1960 | Corsi | 425/DIG. 47 |
| 2,990,206 | 6/1961 | Bogdon | 425/DIG. 47 |
| 3,536,806 | 10/1970 | Jackson | 425/DIG. 47 |
| 3,771,764 | 11/1973 | Myarchi | 425/DIG. 47 |

*Primary Examiner*—J. Howard Flint, Jr.
*Attorney, Agent, or Firm*—Owen, Wickersham & Erickson

[57] ABSTRACT

A method for manufacturing an oil seal element from polytetrafluoroethylene and the like. A tubular billet of polytetrafluoroethylene or the like is provided with inner and outer cylindrical surfaces approximating the desired diameter, and an end wall is faced off perpendicular to the cylindrical surfaces. A series of washers of a desired thickness is then sliced from the billet. In one form of the invention, each washer may next be cut to exactly the desired inner and outer diameter, and, simultaneously, spiral grooves or other hydrodynamic shapes may be formed on one face of each washer, leading from the inner periphery of each washer for a desired distance toward the outer periphery; this may be done by using a novel blank-pierce-coining die that both trims the seal and coins the groove between a pair of metal surfaces at very heavy pressure to permanently deform the material in these surfaces. Each washer is formed under pressure to permanently deform the radially inner portion thereof to a frustoconical shape, this operation preferably being carried on during assembly of the seal. The assembled seal may be held on a shaft-size mandrel during application of a coating to the metal case.

8 Claims, 10 Drawing Figures

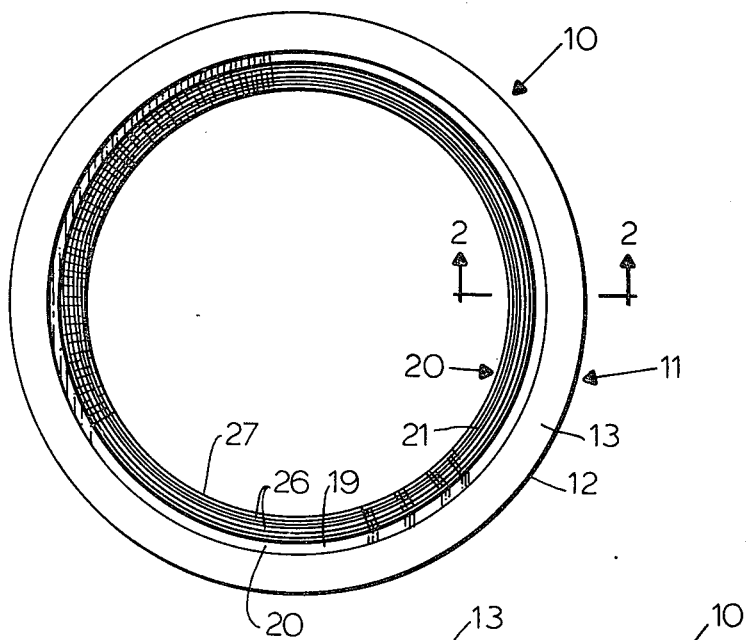
FIG. 1
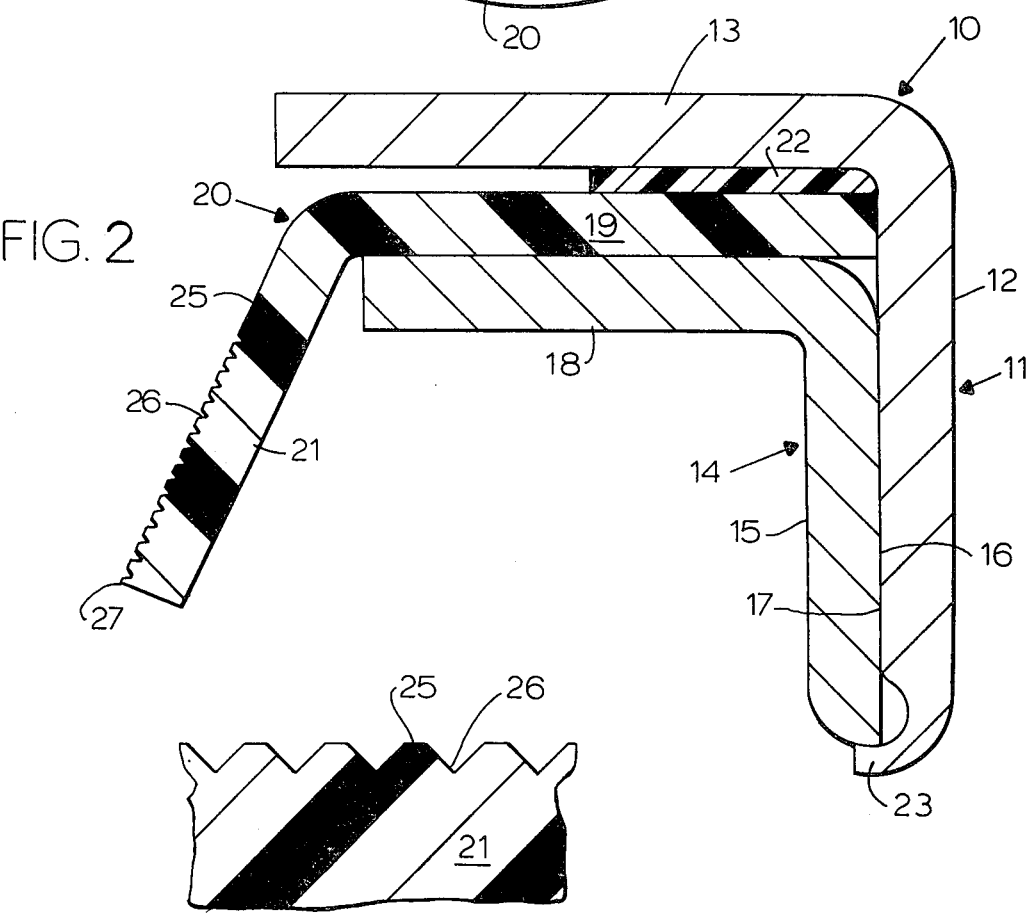
FIG. 2
FIG. 3

3,985,487

APPARATUS FOR MAKING POLYTETRAFLUOROETHYLENE SEALING ELEMENTS WITH HYDRODYNAMIC ACTION

Cross-Reference to Related Applications

This application is a division of application Ser. No. 523,451 filed Nov. 13, 1974, now U.S. Pat. No. 3,929,341, which was a continuation-in-part of application Ser. No. 426,365 filed Dec. 19, 1973, abandoned.

BACKGROUND OF THE INVENTION

This invention relates to the manufacture of hydrodynamic seals from polytetrafluoroethylene and the like. It also relates to a die used therefor.

Polytetrafluoroethylene is a material which is not readily molded, as are the various synthetic rubbers, but which has some very desirable characteristics. In some uses, its ability to withstand high temperatures recommends its use as the oil sealing element which is in rotary contact with the shaft, instead of using one of the less temperature resistant synthetic rubbers. There are also other uses where this material would be advantageous, but heretofore its use has been greatly limited by its inability to be molded to desired shapes in an efficient manner. Normally, it has to be sliced or stamped out from sheets or otherwise formed as a thin washer-like member rather than being molded into any desired shape. Therefore, it is expensive to manufacture, and this expense has greatly limited its use.

The difficulty of molding this material has also made it impractical heretofore to make a hydrodynamic seal from polytetrafluoroethylene. Hydrodynamic seals have conventionally been made by molding a spiral groove or other hydrodynamic structure into the molded element. The washers have been difficult to handle, and such molding of polytetrafluoroethylene has been economically, at least, unfeasible.

SUMMARY OF THE INVENTION

In the present invention an oil seal element is made from polytetrafluoroethylene or like materials by first providing a tubular billet of the polytetrafluoroethylene or other material. This billet may be manufactured so as to have a desired size of inner and outer cylindrical surfaces, and since these may be somewhat rough, a face perpendicular to these two surfaces is then prepared by a facing-off operation, and then a series of slices of a desired thickness are cut off to make a series of washers of the polytetrafluoroethylene, all having roughly the desired dimensions.

In one form of the invention, each wafer or washer is next trimmed, and a spiral groove or other hydrodynamic shape is cold formed on the radially inner portion of one surface of the wafer or washer by coining. Preferably, this may be done by inserting the polytetrafluoroethylene wafer in a novel blank-pierce-coin die. By blanking action, the outer periphery is trimmed to its final dimensions; by piercing action, its inner diameter is trimmed to its final dimensions; also, in between these inner and outer edges the die has a member with ribs of the desired shape to form a spiral groove, and a heavy press load is placed on the material immediately after cutting to permanently deform the wafer, providing one surface thereof with this spiral groove. When that has been done, the seal element may be preformed to shape the inner portion frustoconically, with a flat surface radially outwardly therefrom. If desired, this preforming operation may be combined into the operation of assembling the element into a completed oil seal.

Finally, the seal assembly may be installed on a mandrel of substantially the same diameter as the shaft for which the seal is intended and a coating applied to the outer periphery of the case, to improve its bore-sealing properties (See U.S. Patent Nos. 2,889,163 and 3,275,322). This coating application is done at an elevated temperature, especially the evaporation of solvent therefrom, and the mandrel maintains the desired frustoconical shape. Such a mandrel may, if desired, be used when shipping the seal also.

Other objects and advantages of the invention will appear from the drawings and the description which follows.

BRIEF DESCRIPTION OF THE DRAWINGS

In the drawings:

FIG. 1 is a view in end elevation of a radial-type shaft seal embodying the principles of the invention.

FIG. 2 is an enlarged view in section taken through the seal along the line 2—2 in FIG. 1.

FIG. 3 is an enlarged view of a portion of the inner frustoconical lip of the polytetrafluoroethylene element of FIG. 2.

DETAILED DESCRIPTION OF SOME PREFERRED FORMS OF THE INVENTION

Figure 4:
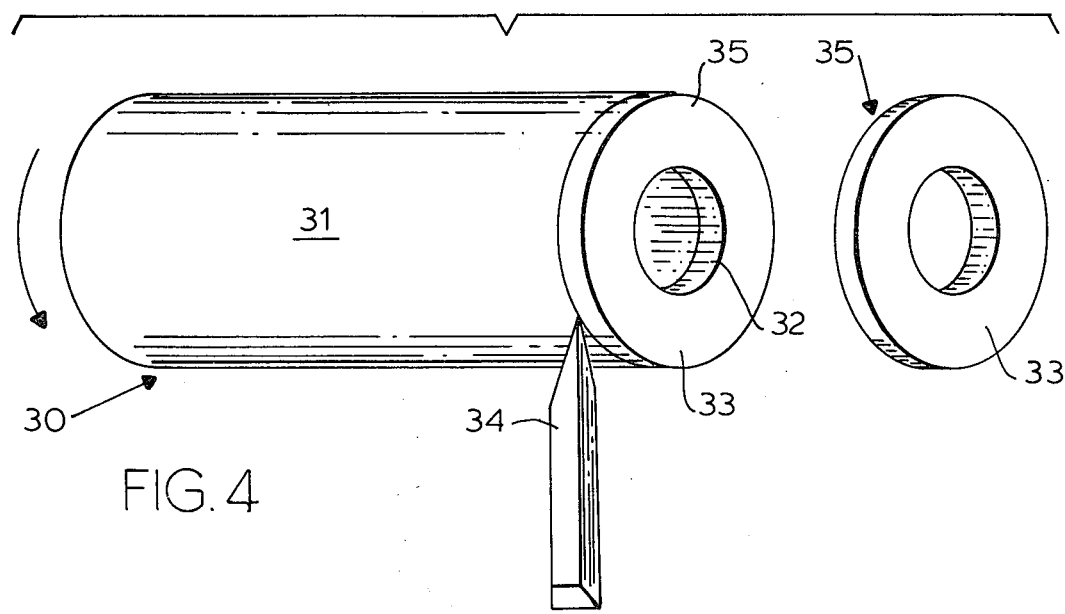
FIG. 4 is a view in perspective of a billet being machined and sliced to provide a series of washers or wafers of polytetrafluoroethylene.

A typical product of the invention, the seal 10

FIG. 1 shows a completed radial shaft seal 10 embodying the principles of the invention, while FIG. 2 shows an enlarged cross-section of this radial shaft seal 10. The seal 10 has an outer case 11 with a cylindrical portion 12 and a radial flange 13. There is also an inner case 14 with a cylindrical portion 15 which nests in the cylindrical portion 12, so that the outer surface 16 of the portion 15 directly bears against the inner cylindrical wall 17 of the portion 12. The inner case 14 also has a radial flange 18. Between the radial flanges 13 and 18 is a flat radial outer portion 19 of a seal element 20, preferably made from polytetrafluoroethylene, and which also has a frustoconical portion 21. A gasket 22 is preferably provided between the polytetrafluoroethylene member 20 and the radial wall 13, to insure sealing between the seal element 20 and the case 11. The radial flange 18 of the inner case 14 is forced toward the radial flange 13 of the outer case 11, so that the wall 18 compresses the portion 19 and holds it tightly and compresses the gasket 22 to prevent leakage and holds the polytetrafluoroethylene element 20 securely in the case and then the outer case 11 has an end portion 23 curled over to lock the inner case 14 tightly in that position. This general construction is, of course, well known.

The inner portion 21 of the polytetrafluoroethylene element 20 is frustoconical in shape and is provided with an air-side surface 25 having a spiral groove 26 leading outwardly from the innermost edge 27 of the seal. This groove 26 is made so that during rotation of the shaft in a particular direction, the groove tends to return any oil which may leak along the shaft, due to scratches in the shaft or minor imperfections in the shaft or even in the shaft sealing element itself, though most of the leakage occurs in this instance from the shaft imperfections. As in all hydrodynamic seals, the purpose of the groove 26 is to return the oil beneath the seal lip 27 and back to the oil side of the seal. Other hydrodynamic shapes may be applied as desired in place of a spiral groove. Practically any shape enabling hydrodynamic action may be applied to the element 20 by employing the present invention.

When the seal 10 is installed, there is shaft interference which flexes the inner portion 21 and makes a portion thereof substantially cylindrical for a short distance; that is why the spiral groove 26 (or other hydrodynamic shaped portion) extends a substantial distance along the face, because the degree of shaft interference is somewhat indeterminate.

Manufacture by the method of FIGS. 4–7

The manufacture of the seal element 20 begins by making a billet 30 of polytetrafluoroethylene having an outer periphery 31 and having an inner periphery 32. This tubular billet 30 is probably not quite exactly the desired shape since it is difficult to get these precise shapes. It is sufficient in the method of FIGS. 4–7 that the outer diameter be somewhat oversize and the inner diameter be somewhat undersize; the blanking and piercing will provide exactly the dimensions required. In the method of FIGS. 4 and 8–10, the outer diameter may be exactly the desired final size. The end wall, if it is not exactly perpendicular to the axis of the billet 30, is faced off to provide a faced wall 33 that is exactly perpendicular. The next step employs a lathe tool 34 to slice a series of wafers or washers 35 of the desired thickness. Each slicing also simultaneously faces the billet 30 so that it is flat and ready for the next slice. This slicing operation is continued until the desired number of washers 35 are then produced or the billet 30 is consumed. The washers 35 themselves are not perfectly flat as cut but assume somewhat of a curved shape.

The next operations are preferably done by a blank-pierce-coin die 40. The die 40 has an upper assembly 41 and a lower assembly 42. The upper assembly 41 includes (1) an outer blanking die portion 43 having a cutting edge 44 and a flat face 45; (2) an inner piercing die portion 46 spaced annularly from the portion 43 and having a flat face 47 and a cutting edge 48; (3) a coining portion 50 having a surface 51, the inner portion 52 of which is provided with a machined spiral rib; and (4) an upper die shoe 53. The blanking portion 43 and the piercing portion 46 are fixed relatively to each other and with respect to the upper die shoe 53; the blanking cutting edge 44 leads the piercing cutting edge by a very small amount. On the other hand, the coining portion 50 reciprocates and is spring-loaded. Each of a set of reciprocative dowels 55 bears at one end against the coining portion 50 and at the other end against a ring 56, which rests on a spring 57.

Figure 6:
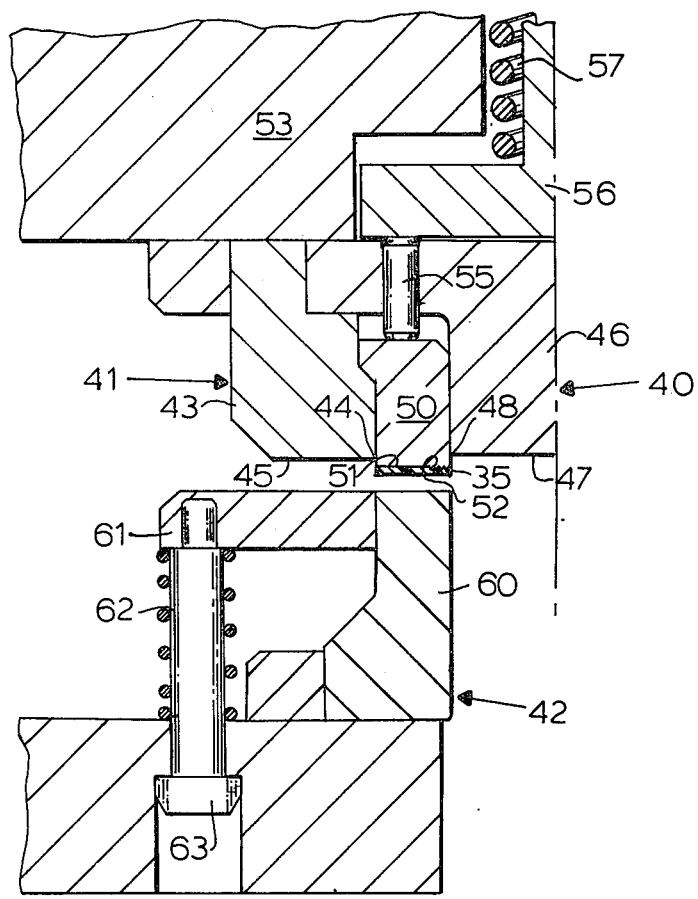
FIG. 6 is a view similar to FIG. 5 showing the wafer and die in the position after the coining has been done and the die is being opened.

When the upper die shoe 53 is in its upper position—i.e., before the die 49 is closed—the coining surface 51 extends down below the cutting edges 44 and 48 and the faces 45 and 47, by an amount approximately equal to the thickness of the wafer 35, substantially as shown in FIG. 6.

One reason for this structure is that it subjects the wafer 35 to a slight preload immediately prior to the cutting and coining operations that straightens out the wafer. For the wafer 35, as cut from the billet 30, is slightly curved rather than truly planar.

Another reason for this is that after the coining operation, when the upper die assembly 41 and the lower die assembly 42 are separated (as is being done in FIG. 6), this structure makes it possible to eject the trimmed and coined wafer 35 by a jet of air.

The lower die assembly 42 has a stationary portion 60 facing the coining portion 50 and of the same size, and relatively reciprocating portion 61 lying radially outside the portion 60, facing the upper die portion 44, and supported on a series of yieldable springs 62. Each spring 62 is located around a respective shoulder screw 63, the upper end of which is threaded to the portion 61 and reciprocates therewith within the lower die assembly 42.

Thus, in operation, the closure of the upper die assembly 41 results, first, in the coining portion's surface 51 coming against the washer 35 and cooperating with the stationary portion 60 of the lower die assembly 42 to hold the washer 35 and flatten it. The coining portion 50 then remains stationary for awhile, acting upwardly against the spring 57 via the dowels 55 and the ring 56. During this time, the cutting edge 44 begins its blanking operation and soon thereafter the cutting edge 48 begins its piercing operation. The cutting edge 48 and face 47 face only space, while the cutting edge 44 and surface 45 face the yieldable member 61 and move it downwardly.

When both blanking and piercing operations have been completed, the press continues downwardly until the coining member 50 bottoms out against the upper flange of the inner piercing die portion 46. There are then exerted many tons of pressure on the wafer 35, forcing the spiral thread into its surface and forming on the wafer's surface the hydrodynamic groove 26. The exact amount of pressure required may vary with the dimensional specifications of the washer 35, as will be obvious to one of ordinary skill in the art. It is important, however, that sufficient pressure be applied to cause permanent deformation of the wafer in the area of the hydrodynamic grooves so that the possibility of material recovery is substantially eliminated.

Figure 7:
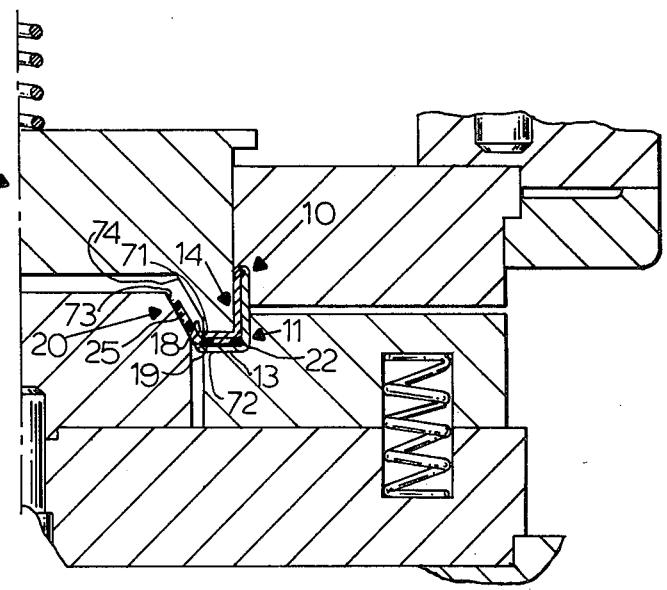
FIG. 7 is a view in elevation and in section of the grooved wafer being assembled into a completed oil seal, while being treated to form its inner portion to a frustoconical shape.

Then the polytetrafluoroethylene washer 35 is ready for being formed into the finished element 20. This may be done in an assembly die 70, as shown in FIG. 7 under substantially less pressure but yet enough to cause cold forming. The result is that the element 20 shown in FIG. 1 is installed into the case 11 as shown and is then ready for use.

The die 70 has two flat surfaces 71 and 72, one of which engages the radial flange 13 of the case member 11, while the other engages the radial flange 18 of the case member 14. The portion 19 of the element 20 and the gasket 22 lie in between the case flanges 13 and 18. The die 70 also has two frustoconical surfaces 73 and 74, facing each other. These grasp the faces of the portion 25 between them and cause that portion to assume its frustoconical shape.

Figure 8:
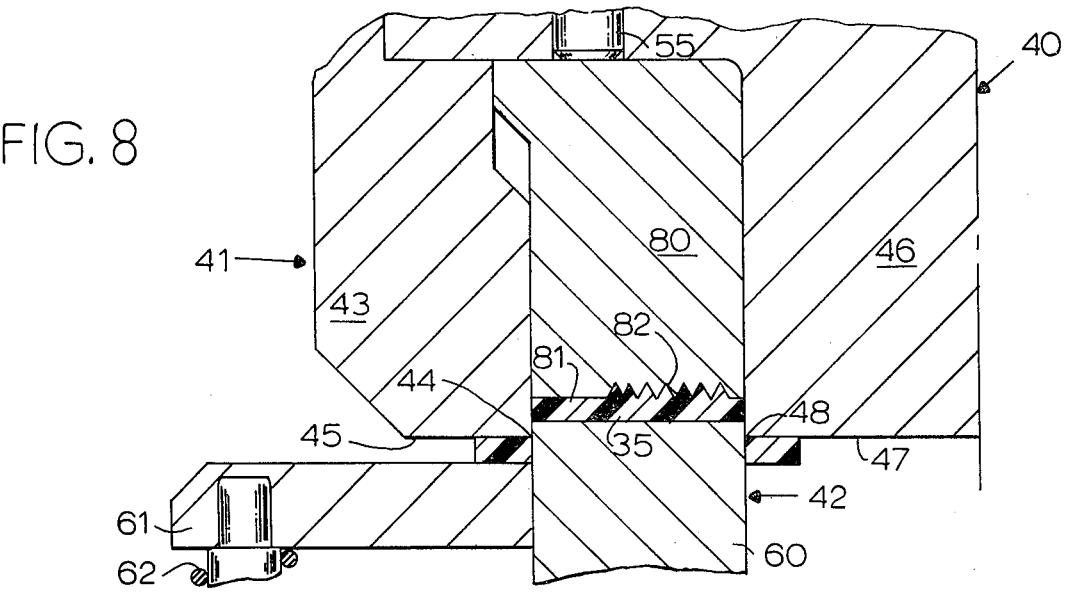
FIG. 8 is a view in elevation and in section similar to a portion of FIG. 5 in which the die has its coining portions recessed and with the die closed and the coining being done.
Figure 9:
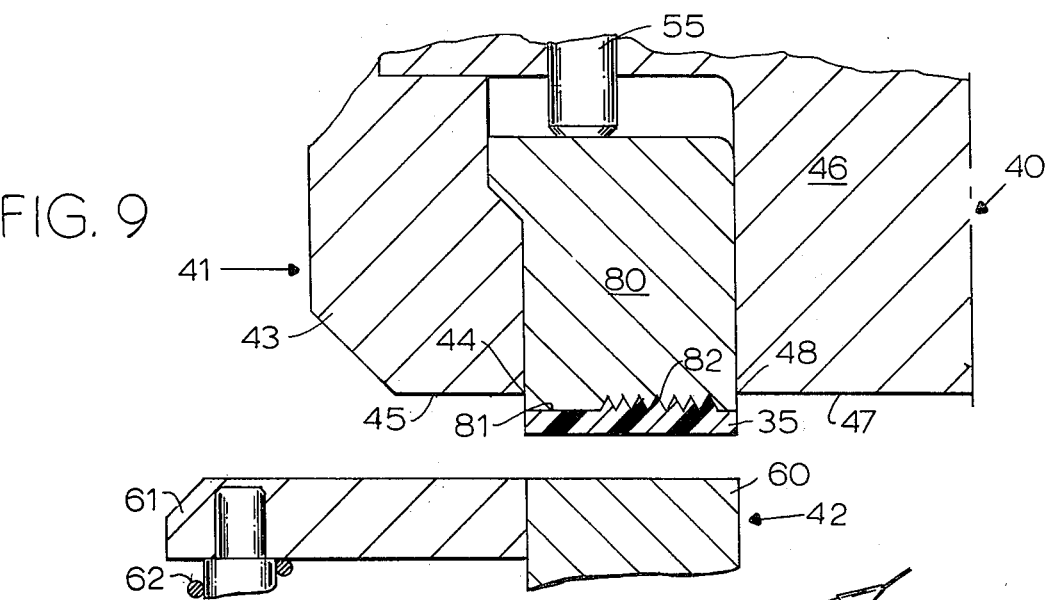
FIG. 9 is a view similar to FIG. 8 with the die open and the coining completed.
Figure 10:
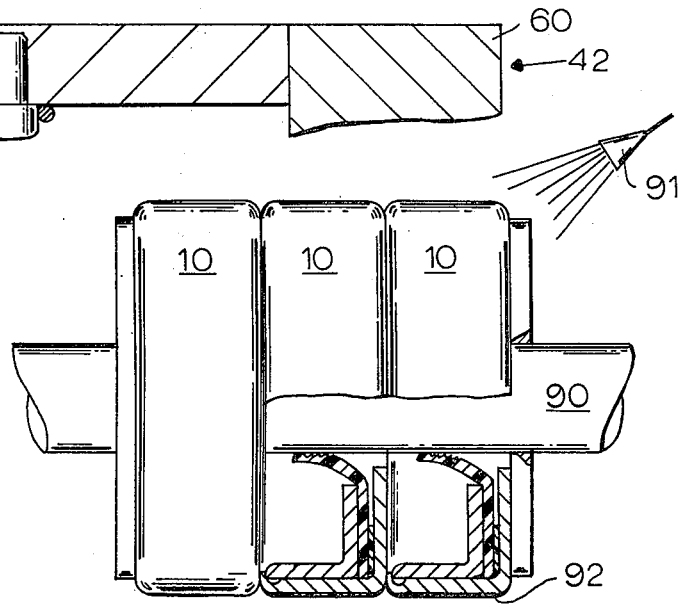
FIG. 10 is a view in elevation and partly in section of a series of assembled seals being supported on a mandrel for application of a coating to the outer case walls.

Manufacture by the method of FIGS. 4 and 8–10:

Another method of the present invention combines the steps of FIG. 4 with those of FIGS. 8–10. The operation of FIGS. 8 and 9 is substantially the same as before, except for the structure of the coining portion.

Figure 5:
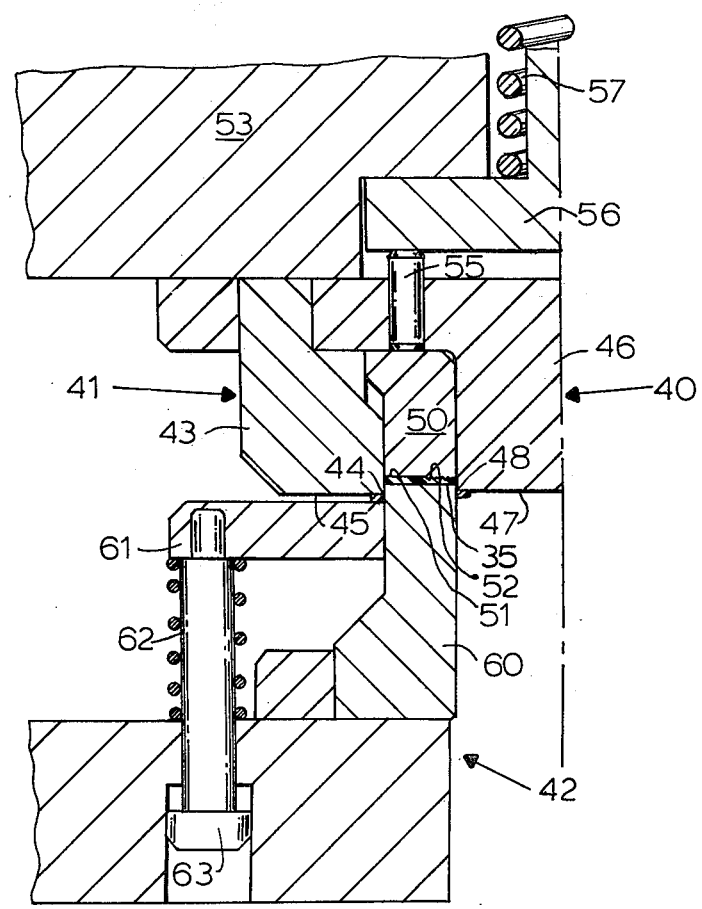
FIG. 5 is a view in elevation and in section of the wafer being trimmed and coined in practising one form of the invention, by a novel blank-pierce-coin die embodying the principles of the invention.

A coining portion 80 has a flat portion 81 to grip an outer annular portion of the wafer 35 while a coining portion 82 that forms the hydrodynamic shape (a spiral groove or whatever) is constructed to be recessed into the member 80 rather than to extend out beyond it, as in the die 50 of FIGS. 5 and 6. The recessing of the coining thread (or other structure) makes the portion 82 less liable to damage or breakage than when the coining thread projects out. It also results in somewhat of a different action. In the die of FIGS. 8 and 9, the portion 81 actually compresses the polytetrafluoroethylene wafer 35, leaving it (after the operation of FIG. 9) about two or three thousandths of an inch thinner than it was before, in order to cause cold flow of the polytetrafluoroethylene up into the coining portion 82, to fill the grooves therein to a depth of about eight thousandths of an inch. This is, as before, usually done at factory ambient temperature, without any heating of the coining member 80, though that may be done if desired. The cold flow of the polytetrafluoroethylene is thus combined with the heavy coining pressure, and the shape is permanent.

After the operation of FIG. 9, the frustoconical shape may be imparted, as by apparatus resembling that shown in FIG. 7.

Often, it is desirable to provide the case wall 12 with a coating to improve sealing in the bore after installation. The application of such coatings may involve elevated temperatures. To protect the sealing elements from receiving the coating and to prevent the memory of the polytetrafluoroethylene from causing loss of the frustoconical shape, it is desirable to employ a mandrel 90, as shown in FIG. 10. The mandrel 90 is the same size, substantially, as the shafts on which the seals 10 are to be installed. A series of seals 10 are placed on the mandrel 90, giving the desired shaft interference with the elements 20, the seals 10 abutting each other and a protecting washer applied at each end. The assembly may then be sprayed from a nozzle 91 to provide a coating 92 and the rise in temperature during application of the coating and evaporation of the coating's solvent therefrom, does not affect the frustoconical shape of the element 20 because of the shaft interference action of the mandrel retaining the desired frustoconical shape of the element 20. If desired, the mandrel 90 may be used for shipping and storing the seals 10.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A die for coining a wafer of material such as polytetrafluoroethylene, including in combination:
   an upper die assembly having an annular spring-supported coining member having a flat gripping portion and a recessed forming portion into which said wafer material cold-flows during coining, and
   a lower die assembly having a gripping member opposite said coining member.

2. A die for substantially simultaneously blanking, piercing, and coining a wafer of material such as polytetrafluoroethylene, including in combination:
   an upper die assembly having an upper die shoe, an annular blanking member having a cutting edge on its inner periphery, and an annular piercing member having a cutting edge on its outer periphery and spaced from said blanking member though concentric therewith, both said blanking and piercing members being stationary relative to said upper die shoe,
   said upper die assembly also having a coining member in the annular space between said blanking and piercing members, a ring resiliently supported on said upper die shoe by spring means between said shoe and said ring, and a plurality of dowel-like members bearing at one end on said ring and on their other end on said coining member, so that said coining member is spring supported, and
   a lower die assembly having a lower die shoe, a gripping member opposite said coining member and stationary relative to said lower die shoe, and a ring opposite said blanking member yieldingly supported by said lower die shoe.

3. The die of claim 2 wherein said blanking member has its cutting edge closer to said lower die assembly than the cutting edge of said piercing member.

4. The die of claim 3 wherein said coining member when unengaged lies closer to said lower die assembly than said blanking and piercing members.

5. The die of claim 2 wherein said coining member has a flat gripping portion and a recessed forming portion lying recessed with respect to said gripping portion.

6. A die for substantially simultaneously blanking, piercing, and coining a wafer of material such as polytetrafluoroethylene, including in combination:
   an upper die assembly having an upper die shoe, an annular blanking member having a cutting edge on its inner periphery, and an annular piercing member having a cutting edge on its outer periphery, and spaced from said blanking member though concentric therewith, both said blanking and piercing members being stationary relative to said upper die shoe,
   said upper die assembly also having a coining member yieldably supported with respect to said upper die shoe for a fixed amount of travel in the annular space between said blanking and piercing members, said coining member being stationarily supported by said upper die shoe for a terminal portion of the closing of said die, and
   a lower die assembly having a lower die shoe with a gripping member opposite said coining member and stationary relative to said lower die shoe.

7. The die of claim 6 wherein said coining member when unengaged lies closer to said lower die assembly than said blanking and piercing members.

8. The die of claim 7 wherein said blanking member has its cutting edge closer to said lower die assembly than the cutting edge of said piercing member.

\* \* \* \* \*